United States Patent
Fischetti

[15] 3,666,296
[45] May 30, 1972

[54] EXPANSION JOINTS FOR RIGID METALLIC PIPES

[72] Inventor: Pasquale Fischetti, Saronno, Italy

[73] Assignee: Pirelli, S.p.A., Milan, Italy

[22] Filed: Mar. 11, 1970

[21] Appl. No.: 18,610

[30] Foreign Application Priority Data

Mar. 13, 1969 Italy..................................14043 A/69

[52] U.S. Cl..................................285/45, 285/114, 285/229
[51] Int. Cl.........................................................F16l 11/12
[58] Field of Search..........................285/229, 226, 299–301, 285/45, 44, 114; 130/121

[56] References Cited

UNITED STATES PATENTS

| | | | |
|---|---|---|---|
| 2,886,885 | 5/1959 | Reid.....................................| 138/121 X |
| 3,029,094 | 4/1962 | Porlasca et al.........................| 285/114 |
| 3,139,115 | 6/1964 | Bowcom et al. ......................| 285/229 X |
| 3,527,481 | 9/1970 | Lewis....................................| 285/114 |
| 3,552,776 | 1/1971 | Leymann..............................| 285/229 |

FOREIGN PATENTS OR APPLICATIONS

| | | | |
|---|---|---|---|
| 968,831 | 4/1958 | Germany...............................| 285/226 |
| 1,158,776 | 12/1963 | Germany...............................| 285/229 |
| 1,253,532 | 11/1967 | Germany...............................| 285/229 |

*Primary Examiner*—Dave W. Arola
*Attorney*—Stevens, Davis, Miller & Mosher

[57] ABSTRACT

The disclosure relates to an expansion joint for metallic pipes, the joint comprising a reinforced rubber body in the form of an annular loop having enlarged lateral edge portions and a pair of locking members for connecting the edge portions of the body to adjacent portions of the pipe ends. Each ring is provided with an undercut groove to receive a portion of the enlarged lateral edge portion. Each locking ring comprises a pair of annular elements disposed in facing contact and interlocked. The first annular element has a greater thickness and is directed towards the outer side of the rubber body. The second element extends outwardly beyond the innermost edge of the first element to thus form the undercut groove.

10 Claims, 5 Drawing Figures

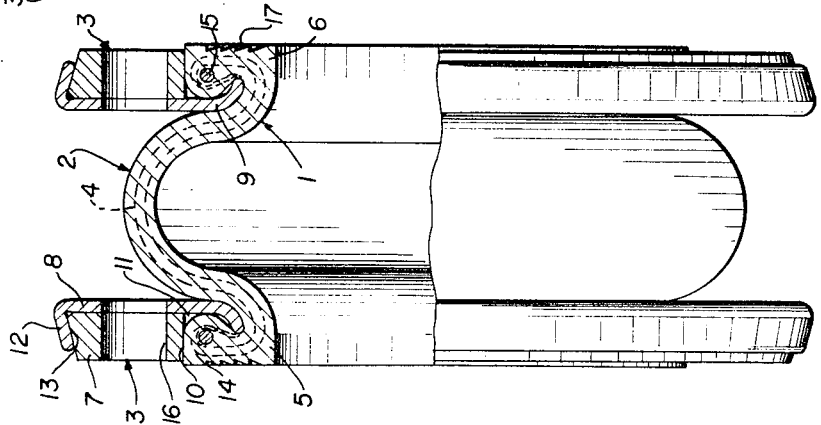
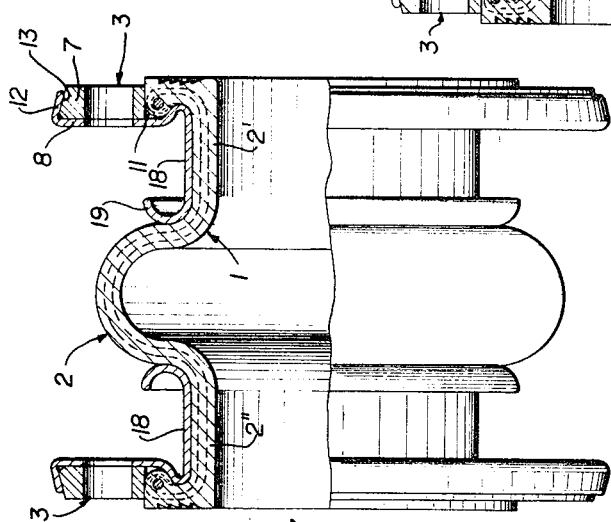
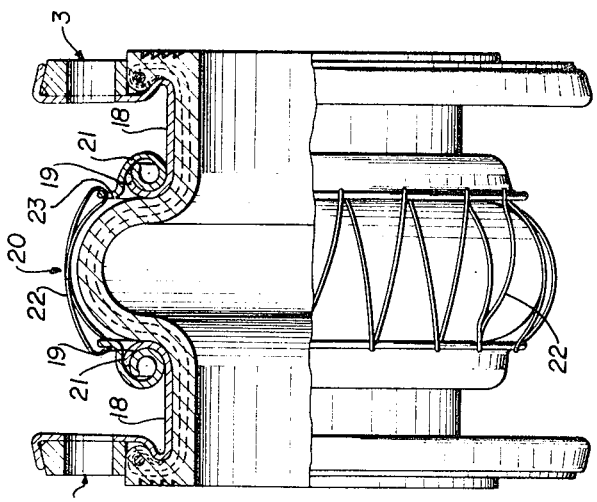
INVENTOR
PASQUALE FISCHETTI

PATENTED MAY 30 1972 3,666,296

EXPANSION JOINTS FOR RIGID METALLIC PIPES

The present invention relates to flexible expansion joints for metallic pipes which comprise a reinforced rubber body in the form of at least one annular loop with lateral portions extending outwardly and the edge portions each having an enlarged head, a pair of locking rings are provided for connecting the edge portions to adjacent portions of the pipe.

As is well known, expansion joints for rigid pipes are pipe elements adapted to compensate, by means of their deformation or by the mutual displacement of their component parts, the length variations of the pipe to which they are applied. Such length variations can for instance be due to variations in the temperature of the conveyed fluid, and/or in the room temperature, or to the settlement of the pipe supports.

In presently known expansion joints, the locking ring on each side of the joint is provided, on its inner edge, with an undercut circular groove, intended to receive the corresponding edge of the rubber body. Up to now, the locking rings of this type were made in a single piece. The presence of the groove in the locking ring influenced the ring thickness and involved a particular processing of this piece. Regardless of the features of the locking ring, when the rubber body was provided with lateral tubular extensions, even of cylindrical shape, between the annular loop and the edges, it required a reinforcing structure which had to be the more resistant the greater the diameter of the extensions, in order to limit the deformation of the joint within stated limits and to allow higher service pressures. In fact, at an equal pressure of the conveyed fluid, the higher the stress exerted the greater the diameter.

An expansion joint having a rubber body provided with a reinforcing structure limited to the presence of layers of textile material disposed from one side of the body to the other; that is, devoid of auxiliary reinforcements inserted at the lateral extensions, had the disadvantage of an immediate massive deformation due to its expansion. This deformation could cause interferences with the bolts fastening the locking rings or with other elements, which could give rise to tears, and in any event caused a prejudicial increase in the stresses on the rubber body, due to the increase of diameter consequent to the expansion. Therefore, expansion joints of this kind gave a satisfactory result only if they had a reduced diameter and if they were subjected to a reduced service pressure. However, for relatively large diameters of the rubber body of the expansion joint, the structure had to be completed with the insertion of strong reinforcements, as for instance metal rings or wire coils, which had to remain embedded in the side of the lateral extensions. In this case, however, the rubber body, in particular in its lateral extensions, had an irregular thickness.

Moreover, in the above described prior art expansion joints, the strong reinforcements and the considerable wall thickness of the rubber body, on the other hand, imparted to the expansion joint a certain rigidity which limited the performance of the joint itself, in particular in respect of its behavior under vibrations of high frequency and low amplitude. In fact, an expansion joint having a certain rigidity was unable to give a satisfactory performance when it was inserted between pipes subjected to vibrations of high frequency and low amplitude. As the joint, to absorb vibrations of such a kind, had to be very flexible, only the joints having a rubber body of relatively small diameter were able to give satisfactory results in this specific respect.

The present invention aims at eliminating the above described disadvantages as regards in particular the locking rings and, in a more general sense, as regards the behavior of the joint under vibrations of high frequency and low amplitude.

An object of the invention is a flexible expansion joint of any kind, provided with two locking rings of simple construction.

A further object of the invention is a flexible expansion joint which may give a satisfactory performance even if it is provided with lateral tubular extensions of relatively large diameter.

The Applicant has found that, if the locking ring has a composite structure, the problem of its simple construction can be solved, and it is also possible to create the premises for the solution of the problem concerning a broadening of the joint employment.

Briefly summarized, an essential feature of the present invention resides in the fact that each metallic locking ring, as described above for presently known flexible expansion joints, embodies a pair of annular elements disposed in facing contact and interlocked, the first element having a greater thickness and being directed towards the outer side of the rubber body, and the second element, preferably made of stamped plate, extending beyond the inner edge of the first element and being directed outwardly to form with the first element an undercut groove.

According to another embodiment of the invention, in the above described locking ring which can be applied on a rubber body provided with tubular, even cylindrical elements at the sides of at least an annular loop, the second annular element, as a succession to the groove, is bent towards the loop to form a cylindrical prolongation of such length and inner diameter that it entirely covers and is in contact with the corresponding lateral extension of the rubber body even when the joint is not in service.

The expression "entirely covers and is in contact with," in reference to the cylindrical prolongation of the locking ring used in the specification and in the appended claims, means that the prolongation covers the corresponding lateral tubular extension of the rubber body along the entire length of the latter and that, even when the joint is not in service, the two mutual extensions are in total or partial contact, it being understood that, in case of partial contact, the remaining part of the concerned rubber extension is such as to be immediately put into contact with the respective prolongation of the locking ring, as soon as the joint is put into service.

The present invention will be more clearly understood from the following description, made by way joint non-limiting example with reference to the attached drawings, in which:

FIG. 1 is a lateral view, partially in section, of an expansion joint according to the invention;

FIG. 2 is a lateral view, partially in section, of an expansion joint according to the invention, in which the rubber body is provided with cylindrical lateral extensions;

FIG. 3 is a lateral view, partially in section, of an alternative embodiment of the joint of FIG. 2.

Figure 4:
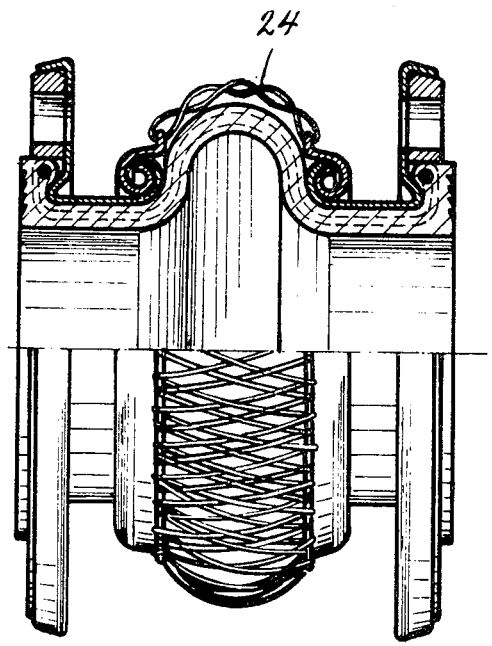
FIG. 4 is a lateral, partially sectioned view of an alternative embodiment of the joint of FIG. 3.

The expansion joint shown in FIG. 1 comprises a rubber body 1, substantially formed by an annular loop 2 protruding outwardly, and by two metallic locking rings 3. These rings are intended to receive the outwardly projecting edges, having enlarged beads, of the rubber body, as it will be explained herebelow and also to be fastened by means of bolts to the flanges of adjacent portions of the pipe, in order to provide a secure connection of the joint to the pipe itself.

Layers of fabric 4, which extend from one end 5 to the other end 6, passing therefore through the entire section of loop 2, constitute the reinforcing structure of the rubber body. Each locking ring 3 is formed by two annular elements 7 and 8, which face each other in frictional contact and are interlocked to form a single unit.

Annular element 7 has a thickness greater than that of the annular element 8, which is preferably made of stamped plate and is directed towards the outer side of the rubber body, which is intended to come into contact with the flange of the length of rigid pipe to be connected (not shown).

The annular element 8, which is consequently turned towards the loop 2, protrudes with its portion 9 beyond the inner edge 10 of the ring 7, and is bent towards the joint ends to form with said edge 10 an undercut groove 11. Moreover, the outermost portion 12 of the annular element 8 is folded against the conical outer edge 13 of the ring 7, so that the two elements 7 and 8 are interlocked.

The corresponding edges 14 of the rubber body 1 are encased within grooves 11 of the locking rings. As each edge 14 protrudes in the outer radial direction and has in section an enlarged bead, it remains housed within the groove 11 when the locking ring 3 is firmly connected to the corresponding flange (not illustrated) of the pipe by means of bolts passing through holes, one of which is indicated with 16, and the corresponding hole (not illustrated) of said flange. The bolts, of course, cooperate to the secure connection of annular elements 7 and 8 when the expansion joint is assembled on the pipe. Each of the edges 14 of the rubber body 1 has at 17 a toothed profile, which is provided in order to provide a tight fit when it is in contact with the corresponding flange of the metallic pipe (not illustrated).

Moreover, each edge 14 is reinforced by means of an annular core 15 made of metal or of any other suitable material, which is embedded in the rubber. The ends of the textile layer 4 are wound up about said cores 15.

Further, locking rings 3 can be combined with rubber bodies of a different type. For example, FIG. 2 illustrates an expansion joint, in which the rubber body 1 has a loop 2 and two cylindrical lateral extensions 2' and 2''. In the locking rings 3 of this joint, having annular elements 7 and 8, the element 8 is folded, in succession to the groove 11, towards the loop 2 to form a prolongation 18, having such a length and inner diameter that it covers and is in contact with the entire outer surface of the corresponding cylindrical lateral extensions 2' and 2'' of said rubber body, even when the joint is not in use.

It is preferable that the free edge 19 of the cylindrical prolongation 18 of the annular element 8 of the locking ring 3 be curved upward and backward. In this way, the loop 2 is prevented from being cut when it comes in contact with the metallic edges under deformation due to squeezing or angular displacement.

The advantages afforded by this form of locking ring are evident. As one of the two components of each locking ring 3; that is the annular element 8, is formed of a plate, such element can be drawn to attain its intricate pre-established structure.

Moreover, the annular element 8 can be interlocked with the annular element 7 by simply rolling the portion 12 of the former against the conical edge 13 of the latter. The annular element 8, however, can be secured to the annular element 7 in a different way, as for instance by spot welding. The union of the annular elements 7 and 8 forms the groove 11 of the locking ring 3.

The same system is followed when it is desired to obtain a locking ring in which the annular element 8 is provided with the cylindrical prolongation 18.

In the expansion joint according to the invention, which is provided with locking rings having a composite structure and with cylindrical lateral prolongations, the prolongations, which are metallic, constitute an efficient reinforcement to the underlying tubular extensions of the loop of the rubber body. It follows that the reinforcing structure embedded in the wall of the rubber body can be for instance limited to a plurality of layers of fabric of any kind, made of textile fibers, metal wires or other material, disposed from one end to the other, even if the rubber body has a relatively large diameter at its lateral cylindrical extensions.

In fact, the reinforcement of the rubber body in the event of strong stresses, which would tend to deformate it during expansion, remains committed to the metallic cylindrical prolongations 18 of the locking rings. In this way, even if it has a large diameter, the expansion joint can be constituted by a rubber body having a relatively small and constant wall thickness, from one of its ends to the other. Consequently, even if it has a large diameter, the rubber body of the joint according to the invention has a continuous surface from one end to the other, different from the rubber bodies obtained up to this time, which, in case of large diameters, were to be provided with strong reinforcements at their lateral cylindrical extensions and therefore giving rise to differences of wall thickness between the extensions and the loop.

In rubber bodies heretofore produced, considerable thickness of the rubber portion presented a serious limitation in the mutual deformation of the two joint arms, this does not take place in the joint according to the present invention, since this body has a relatively small thickness, which is constant from one end to the other, even with the loop is of a large diameter and greater size.

For all the above indicated reasons, the joint according to the invention has relevant flexibility characteristics, which allow it to absorb high frequency and low amplitude variations, even through the diameter of the rubber body is relatively large.

In a further embodiment of the invention, illustrated by FIG. 3, the free curved edge 19 of a cylindrical lateral prolongation of a locking ring 3 and the corresponding edge 19 of the cylindrical lateral prlongation of the other locking ring 3, of an expansion joint are connected to an intermediate connecting element 20, which passes over the loop of the rubber body to act as limit means for the joint expansion.

More precisely, the intermediate connection element 20 is constituted by two terminal rings 21, secured on the mutual bent edges 19 of the prolongations of the locking ring 3 and by interlaced wires or cords 22, made of metal or of other suitable material, which pass from one terminal ring to the other through holes 23. The terminal rings 21 can be connected in a different way, for instance by means of a wire net 24 in FIG. 4.

This limiter for the expansion joint affords considerable advantages over the conventional linear limiters already known, which gave satisfactory results in the event of an elongation of the expansion joint, but permitted angular deformations between the arms of the joint itself, which were too small for the requisites of its service.

Figure 5:
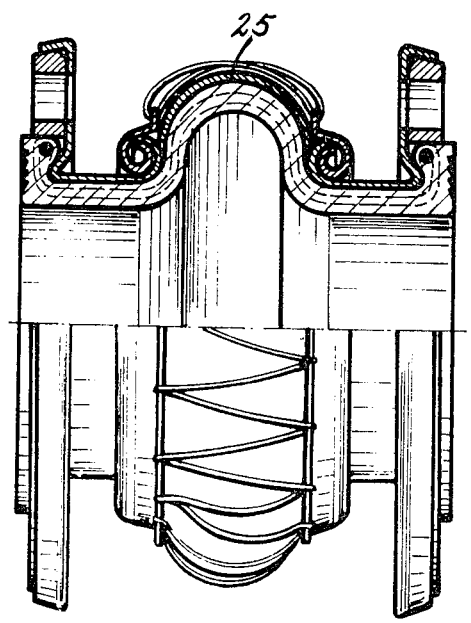
FIG. 5 is a lateral partially sectioned view of the joint of FIG. 3 showing the inclusion therein of a further element.

This limitator allows, in fact, considerable angular deformations between the two joint arms. The presence of the limitator, placed into contact with the loop of the expansion joint, can be used to insert and to maintain in place a protective material 25 (FIG. 5) which may cover and protect the loop. This material can have a protective action against fire and may be therefore made of asbestos or of aluminized fabrics, or against possible accidental damages due to shocks or impacts against sharp bodies. If desired, the whole unit formed by the prolongations of the locking rings and by the intermediate connecting ring can retain a material protecting the entire outer surface of the flexible joint having lateral cylindrical extensions.

What is claimed as new is:

1. A flexible expansion joint for inter-connecting two pipes, comprising: an annular shaped body of reinforced rubber having opposite axial ends and a central portion which in axial cross-section protrudes radially convexly from said ends, said ends each including an annular radially outwardly projecting collar portion, a pair of metallic locking rings, for each of said ends, each pair of rings defining an annular groove open at the outer axial end thereof, each of said collar portions being lockingly engaged in a respect one of said grooves, the rings of each of said pair being axially adjacent and secured to each other and in facing contact with each other, aid groove being formed between respective radially spaced apart walls of said rings.

2. The joint of claim 1, a first of said rings having a conical radially outer wall, the second of said rings having an outer edge portion bent over said conical wall whereby said rings are lockingly engaged against axial movement relative to each other.

3. The joint of claim 2, wherein said body includes tubular portions of constant diameter extending from said central portion to said ends, each of said second rings comprising an extent which is bent axially outwardly to define a wall of said groove and is then bent axially inwardly to define a cylinder circumscribing the entire outer surface of said tubular portions.

4. The joint of claim 3, the axially innermost end of said cylinder being bent axially outwardly to face away from said central convex portion of said body.

5. A joint as in claim 3, characterized in that the rubber body is provided, as a reinforcing structure, with layers of fabric reinforcing fibers, which extend from one end of the body to the other.

6. A joint as in claim 3, characterized in that the bent innermost end of the cylindrical prolongation of the second element of a locking ring, and the corresponding edge of the second element of the other locking ring are connected to an intermediate connection element, which passes over the loop of the rubber body to act as a limiter.

7. A joint as in claim 6, characterized in that said angular connection element is provided with terminal rings and a lacing element, which passes through holes formed in said terminal rings which, on their turn, have in cross section a shape complementary to that of the corresponding bent free edge of the cylindrical prolongation of the second element of the locking ring on which each terminal ring is secured.

8. A joint as in claim 7, characterized in that a net, made of wire or of a like material, is used in place of said lacing element.

9. A joint as in claim 6, characterized in that a protective material, is interposed between the annular intermediate connecting element and the loop of the rubber body.

10. A joint as in claim 9, characterized in that said protective material extends below the cylindrical lateral prolongations of the locking rings.

* * * * *